Jan. 26, 1943.     M. CRAIG     2,309,442

PISTON RING

Filed July 5, 1938

Inventor
Morris Craig.
H. M. Plaisted,
Attorney.

Patented Jan. 26, 1943

2,309,442

UNITED STATES PATENT OFFICE 2,309,442

PISTON RING

Morris Craig, St. Louis, Mo., assignor to Hastings Manufacturing Company, Hastings, Mich.

Application July 5, 1938, Serial No. 217,365

8 Claims. (Cl. 309—45)

This invention relates to certain new and useful improvements in piston rings, the peculiarities of which will be hereinafter fully described and claimed.

The main objects of my improved piston ring are to provide means first, for snug engagement with easy in and out movement of upper and lower coils of a one-piece spring-metal piston ring with the upper and lower walls of the piston groove; second, for improved contact with the cylinder walls by said upper and lower coils; third, for radially expanding outward said upper and lower coils by the interposed middle coil; fourth, for shifting in opposite directions circumferentially and radially with equal pressure, the opposite portions of the lower and upper coils especially, to compensate for the increase of the cylinder diameter due to wear; fifth, for controlling the wall contact of both the outer coil rings by the intermediate coil although the diameter of the intermediate coil may be the same diameter as the outer coils, or even less; and sixth, for the herein described method of forming my improved piston ring; and other objects and details of construction hereinafter described and claimed.

Figure 4:
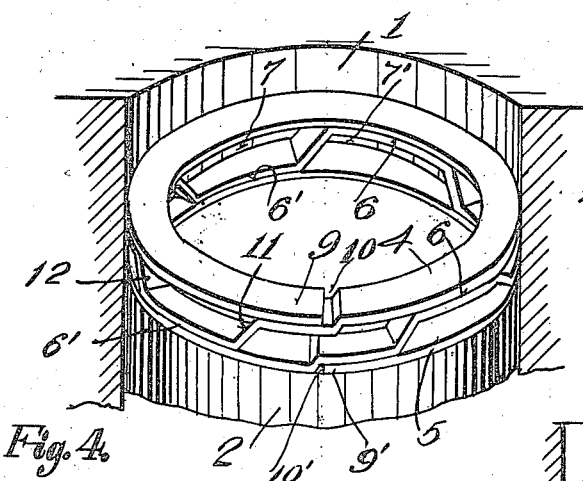
Figure 6:
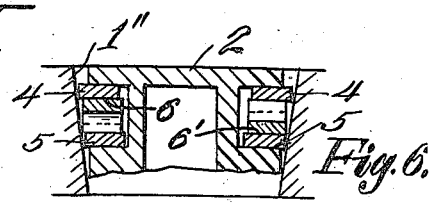
Figure 5:
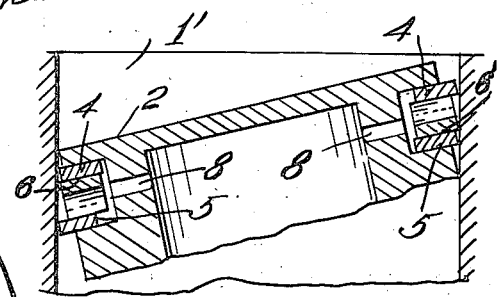
Figure 3:
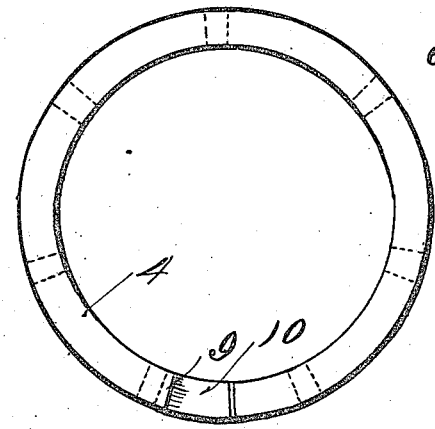
Figure 2:
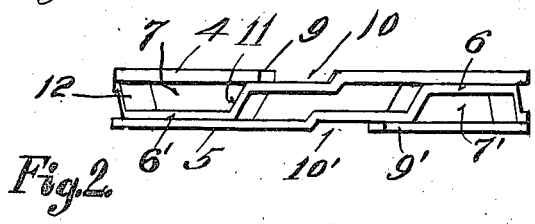
Figure 1:
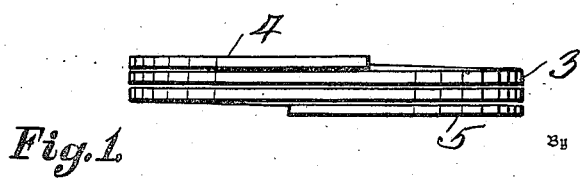

In the accompanying drawing in which like reference numerals indicate corresponding parts, Fig. 1 represents an edge view of a portion of a continuous spring-metal helix, said portion being of substantially three coils and of sufficient length to form my improved piston ring;

Fig. 2, an edge view of my ring after being formed from the helical portion shown in Fig. 1, and before its compression for insertion in the piston groove;

Fig. 3, a plan view of Fig. 2 showing the middle coil and the outer coils of substantially the same diameter before compression of the ring to mount it in the cylinder;

Fig. 4, a perspective view of my piston ring as mounted in the piston, with the upper portion of the piston removed to show the ring, and the enclosing cylinder in section;

Fig. 5, a sectional view of a cylinder that has an increased diameter due to wear, and a sectional view of a portion of the piston with my ring mounted therein, illustrating its movement when inclined in such a cylinder—the same being distorted for illustration; and Fig. 6, a similar view of a tapering cylinder indicating the action of my ring therein.

Referring to the drawing the numeral 1 represents the cylinder wall in which is operatively mounted a piston 2 grooved for a piston ring mounted therein as indicated by the figures.

My improved piston ring comprises multiple coils or convolutions, at least three, of a spring-metal helix 3, Fig. 1, of a suitable circumferential length of a flat thin strip to form my improved piston ring. This helix is preferably formed by winding the strip of spring-metal edgewise upon a cylindrical mandrel of proper size to make the outer diameter of said helix of practically the same diameter as the cylinder 1. The upper and lower coils 4 and 5 respectively are spaced apart by the inner coil without particular up and down pressure so as to be substantially in parallel horizontal planes and make an easy fit in the piston groove. The middle coil is made to occupy a space that is wider up and down than that of said coil originally by bending it into permanent crimps forming bearing surfaces 6 and 6', flat or otherwise, respectively engaging the outer coils 4 and 5. These bearing surfaces are connected by oppositely inclined walls which alternate with openings 7—7' as shown in Figs. 2 and 4. These openings allow the passage of oil through suitable oil holes 8, Fig. 5, communicating with the piston groove. The terminal end 9 of the upper ring slidingly engages as a bearing surface an adjacent recess 10 or other portion in the said ring 4. The wall of said recess integrally connects the adjacent bearing surface 6' by a slanting wall 11 as shown in Figs. 2 and 4. The other end of said bearing 6' is connected by a similar reversely inclined wall 12 with an upper adjacent bearing surface.

The lower outer ring 5 has a similar recess 10' bearing portion formed upward to provide for sliding engagement of the lower terminal end 9' so as to bring all its lower face in the same horizontal plane and substantially parallel to the plane of the upper coil 4. Two flat rings are thus formed by the upper and lower outer coils when inserted in the piston groove.

As before stated, the helix is formed so that its outer diameter is substantially that of the cylinder 1, but the formation of the bearing surfaces and alternate spaces in the middle ring as shown in Fig. 2, causes said middle coil to expand in outer diameter and slide their ends 9—9' outward circumferentially and oppositely on their bearing surfaces. The intermediate coil is increased in diameter by being crimped and the act of crimping pulls circumferentially on the outer coils, and thus increases radially the expansion of the flat outer ring coils since they are integral therewith. That is to say, the expanding force of half the middle coil to the left from the end 9, tends to unwind and expand the upper coil 4, and the other half of the middle coil around to the end 9', tends to expand and unwind the lower coil. This expanding force acts with substantially the same pull circumferentially in opposite directions on the outer coils as shown in Fig. 2. Such expansion of the diameter of all the coils is indicated in Fig. 2 and shown in plan view Fig. 3. When the middle coil is compressed circumferentially and radially to insert the ring in the cylinder, the terminal ends slide along in their bearing recesses and approach the ends of said recesses as shown in Fig. 4. By such compression of the middle coil, the outer coils return from their expanded condition to their original diameter and circumference which are substantially the same as the diameter and circumference of the cylinder into which they are to be inserted; thus making practically perfect contact around the circumference of the cylinder and the ring.

This middle coil mainly functions as a controller of the upper and lower coils of the piston ring. When the ring is uncompressed as in Fig. 2, the middle coil should be the same diameter or even less than the outer coils. It should not be greater, since compression of the middle coil to the cylinder diameter would then react upon the outer coils more than is required to restore them to their initial true circumference and diameter corresponding to the cylinder in which the ring is used.

The vertical distance between said bearing surfaces 6 and 6' of the middle coil is sufficient to space the outer coils apart so as to bring their upper and lower surface respectively into snug yet easy contact with the upper and lower walls of the groove in the piston. It is preferred not to have a spring action in said middle coil tending to jam the outer coils against the adjacent walls of the piston groove, since it is one of the objects of my ring construction to provide for its easy movement radially in its groove so as to maintain contact at all times with the cylinder wall without destructive wear by expanding pressure thereon, yet make efficient contact with the cylinder wall for the upper and lower coils of the ring.

I have found that my ring as above described is particularly effective in its application to pistons that fit loosely in the cylinder due to excessive wear at opposite portions of the cylinder wall, 1'. In Fig. 5 I have illustrated in exaggerated form, the slanting position of one end of a rocking piston in such a worn cylinder. It will be observed that the upper coil tends to move outward as shown at the ring and pull the lower coil in the opposite direction into contact with the adjacent portion of the cylinder through its integral connection with the middle coil, as indicated at the left in Fig. 5.

In Fig. 6 a tapering cylinder 1" is shown, and the lower coil being compressed expands the upper coil through the connecting middle coil and the outer coils act in opposite directions. That is to say, the lower coil being compressed by the tapering cylinder, expands the upper coil against the cylinder wall, through the middle coil, so that all parts of the upper and lower coils contact the cylinder walls with the same pressure.

The number of crimps in the middle coil is preferably the same on opposite halves of its circumference, so as to produce substantially equal, though opposite, pull on the upper and lower coils.

While I have illustrated my preferred form of piston ring I do not limit myself to the exact construction shown except by the appended claims. The figures in the drawing show the ring enlarged and thickened in the spring-metal of which it is constructed, in order to illustrate and explain the principle and method included in my invention.

Having thus fully described my invention what I claim as new and desire to secure by Letters Patent, is:

1. An expansible piston ring comprising spaced flat parallel cylinder wall contacting coil elements, and an intermediate spacer coil element connecting said cylinder wall contacting coil elements, said coil elements being formed integrally of ribbon steel, the spacer coil element having crimps therein to space the side coil elements, the cylinder wall engaging coil elements being joined with the spacer coil element by step joint offsets of a depth approximately the thickness of the cylinder wall contacting elements, the free ends of the cylinder wall contacting elements being in overlapping sliding relation to such joint steps, the several coil elements all being under compressive stress as when the ring is in operative relation to a piston and its coacting cylinder, the diameter of the cylinder contacting elements being greater than that of the spacer element whereby the expansion stress of the three elements when the ring is in use is sustained mainly by the cylinder wall contacting elements.

2. An expansible piston ring comprising spaced flat parallel cylinder wall contacting coil elements, and an intermediate spacer coil element connecting said cylinder wall contacting coil elements, said coil elements being formed integrally of ribbon steel, the spacer coil element having crimps therein to space the side coil elements, the cylinder wall engaging coil elements being joined with the spacer coil element by step joint offsets of a depth approximately the thickness of the cylinder wall contacting elements, the free ends of the cylinder wall contacting elements being in overlapping sliding relation to such joint steps, the several coil elements all being under compressive stress as when the ring is in operative relation to a piston and its coacting cylinder.

3. A one-piece piston ring of coiled ribbon steel comprising spaced flat parallel cylinder wall contacting coil elements, and an intermediate spacer coil element connecting said cylinder wall contacting coil elements, the spacer coil element having offsets therein spacing the side coil elements, the free ends of the cylinder wall contacting elements being in overlapping sliding relation to offset portions of the spacer coil element, the several coil elements all being expansible and under compressive stress when the ring is in operative relation to a piston and its coacting cylinder, the diameter of the cylinder contacting elements being greater than that of the spacer element whereby the expansion stress of the three elements is sustained mainly by the cylinder wall contacting elements when the ring is in use.

4. A one-piece piston ring of coiled ribbon steel comprising spaced flat parallel cylinder wall contacting coil elements, and an intermediate spacer coil element connecting said cylinder wall contacting coil elements, the spacer coil element having offsets therein spacing the side coil elements, the free ends of the cylinder wall contacting elements being in overlapping sliding relation to offset portions of the spacer coil element, the several coil elements all being expansible and under compressive stress when the ring is in operative relation to a piston and its coacting cylinder.

5. A one-piece piston ring of ribbon steel comprising spaced flat parallel cylinder wall contacting coil elements, and an intermediate spacer coil element connecting said cylinder wall contacting coil elements, the spacer coil element being laterally deformed providing spacing members for the side coil elements, the cylinder wall engaging coil elements being joined with the spacer coil element by step joint portions of a depth approximately that of the thickness of the ribbbon steel, the free ends of the cylinder wall contacting elements being in overlapping sliding relation to such step joint portions, the several coils coacting to provide a resilient expansible spring the terminal coils of which constitute cylinder wall engaging elements which may independently follow a cylinder bore but which coact with the intermediate spacer coil in providing cylinder wall engaging unit pressure.

6. A one-piece piston ring formed of ribbon steel and comprising three integral coils, the outer coils being flat and disposed in spaced parallel relation, the intermediate coil being deformed to space the outer coils at a greater distance than the thickness of the ribbon steel of the coils and provide drain openings between the outer coils, the intermediate and outer coils being connected by inwardly stepped joint portions with which the ends of the outer coils have lapping sliding engagement.

7. A one-piece piston ring formed of ribbon steel and comprising three integral coils, the outer coils being flat and disposed in spaced parallel relation, the intermediate coil being deformed to provide spacing members for the outer coils and drain openings between the outer coils, the ends of the outer coils being in lapping sliding engagement with offset portions of the spacer coil.

8. An expansible spiral piston ring comprising spaced flat parallel cylinder wall contacting side coil elements and an intermediate ribbon steel spacer coil element having crimps therein to space said side coil elements, said spacer coil element connecting said cylinder wall contacting side coil elements and being formed integrally therewith.

MORRIS CRAIG.